United States Patent [19]

Dito

[11] 4,199,756
[45] Apr. 22, 1980

[54] GUIDE APPARATUS FOR TRAILER HITCH

[76] Inventor: Rudolph D. Dito, 401 Buck Ave., Vacaville, Calif. 95688

[21] Appl. No.: 916,628

[22] Filed: Jun. 19, 1978

[51] Int. Cl.² .......................... G08B 21/00; B60Q 1/00
[52] U.S. Cl. .................................. 340/686; 340/52 R
[58] Field of Search ...................... 340/687, 686, 52 R

[56] References Cited

U.S. PATENT DOCUMENTS

| | | | |
|---|---|---|---|
| 3,060,407 | 10/1962 | Beiswenger | 340/52R |
| 3,418,628 | 12/1968 | Fenner | 340/686 |
| 3,774,149 | 11/1973 | Bennett | 340/686 |
| 3,901,536 | 8/1975 | Black | 340/687 |

*Primary Examiner*—Glen R. Swann, III
*Attorney, Agent, or Firm*—Townsend and Townsend

[57] ABSTRACT

Apparatus for guiding the driver of a towing vehicle in positioning a first hitch element on the towing vehicle adjacent a complementary second hitch element on a trailer so that they can be readily engaged. The apparatus includes an arm which is adapted to be releasably mounted to the second hitch element. The arm has a first portion extending transversely from the second hitch element to beyond the side of the towing vehicle, and a second portion extending forwardly closely adjacent the side of the towing vehicle to indicate to the driver when the towing vehicle and trailer are transversely aligned. The guide apparatus further includes sensing means which are mounted proximate the second hitch element and are adapted to be actuated by the first hitch element as the towing vehicle and trailer are moved into positions in alignment with one another so that their hitch elements are adjacent. Indicator means, which may include an electric light or buzzer, are activated in response to the actuation of the sensing means to indicate to the driver that the hitch elements are adjacent and ready for engagement.

18 Claims, 4 Drawing Figures

U.S. Patent    Apr. 22, 1980    4,199,756
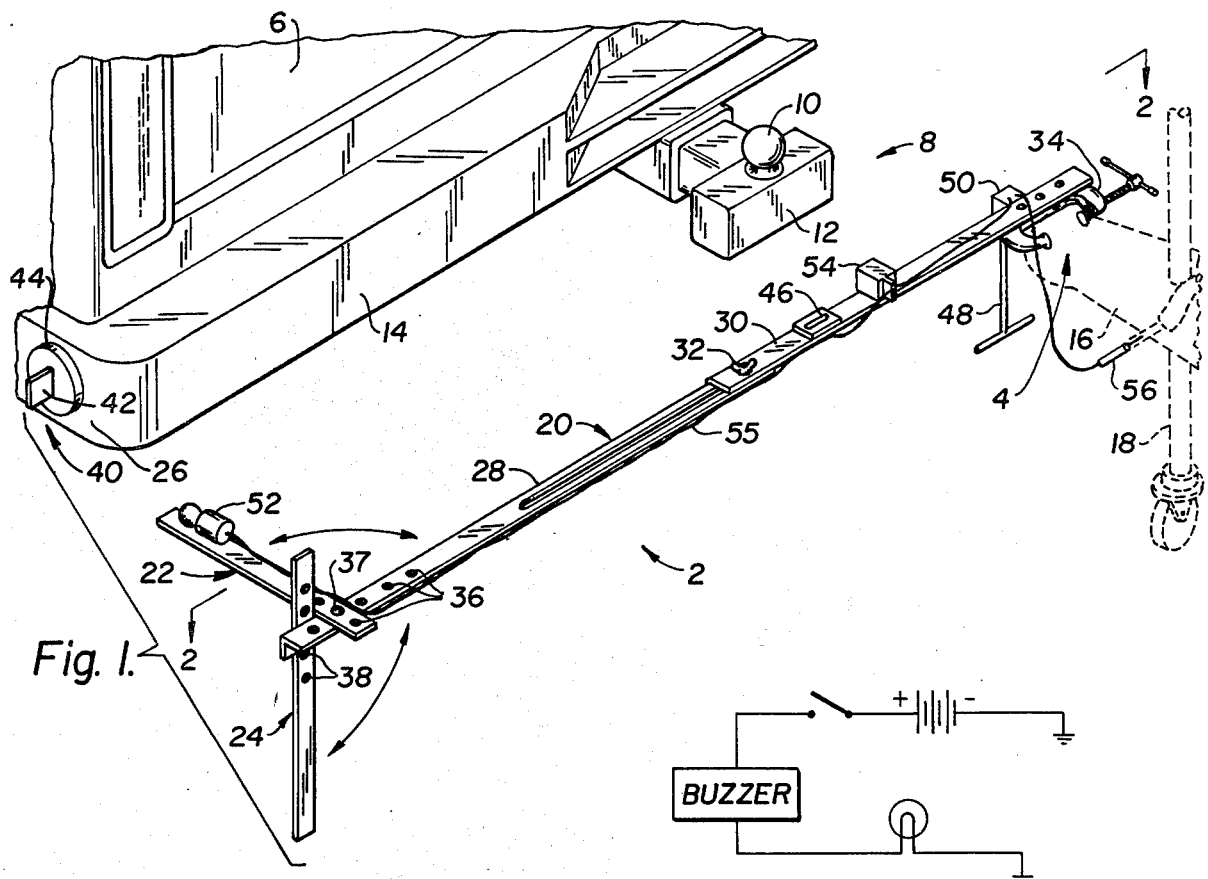
Fig. 1.
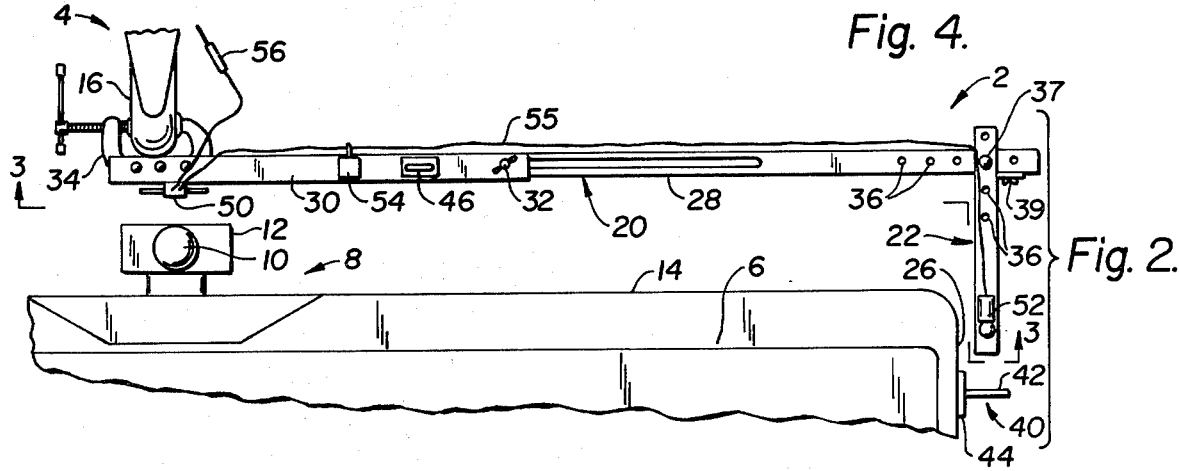
Fig. 2.
Fig. 4.
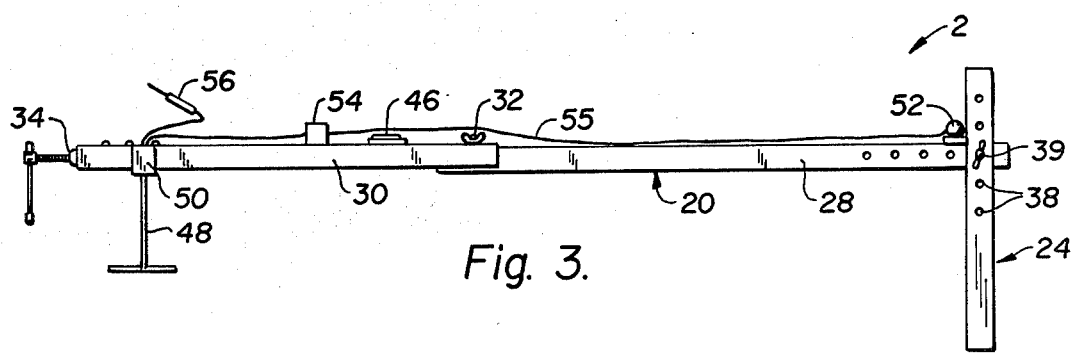
Fig. 3.

GUIDE APPARATUS FOR TRAILER HITCH

BACKGROUND OF THE INVENTION

The present invention relates to automotive accessories, and more particularly to an apparatus for aiding the driver of a towing vehicle in positioning the hitch element on the back of the towing vehicle adjacent a complementary hitch element on the front of a trailer.

The use of trailers that are pulled by automotive vehicles has increased immensely over the past few decades. During this period a variety of trailer hitches has evolved. The trailer hitch most commonly used is one that includes a rigid ball supported in an upwardly extending position from the rear portion of the automotive vehicle, and a semi-cylindrical socket supported forwardly of the trailer which can removably engage the ball. Although this type of trailer hitch is quite serviceable, its primary disadvantage, and that of other trailer hitches used for the same purpose, is that the driver of the vehicle cannot see the hitch elements. It is extremely difficult to maneuver the vehicle into proper alignment with the trailer so that their respective hitch elements are adjacent and can be readily engaged. In most instances, the hitching operation is accomplished on a hit-or-miss basis or with the instruction of an onlooker. Most trailers are large and heavy and therefore it is difficult, if not impossible, for a single individual to shift the position of the trailer by hand. Even with an onlooker giving instructions to the driver of the vehicle, the hitching operation is confusing, and as a result, the engagement of the two hitch elements is often a time-consuming and exasperating experience.

A number of devices have been patented which are designed to aid the driver of the vehicle in accomplishing the hitching operation. U.S. Pat. Nos. 3,734,539 and 4,030,775 disclose devices in which a connection is made between the trailer and the vehicle by means of a guideline or tape, and sensors are used to indicate misalignment so that proper alignment can be achieved. U.S. Pat. No. 3,825,921 discloses another device which comprises an emitter mounted on the towing vehicle and a coil mounted on the trailer. The strength of the current induced in the coil is monitored in order to determine the proximity of the emitter and the coil. These devices are too complex to be practical.

U.S. Pat. No. 3,159,917 discloses a hitch guide which includes a rod is attached to the trunk of a towing automobile. The rear end of the rod has a resilient member which is adapted to engage a pointer on the trailer hitch to indicate proper alignment. This device depends on the keen eyesight of the driver. In addition, it is not well suited for use with vans, pickup trucks, and other automotive vehicles not having trunks and rear windows which afford a clear view thereof.

SUMMARY OF THE INVENTION

The present invention provides an apparatus for guiding the driver of a towing vehicle in positioning a first hitch element on the towing vehicle adjacent a complementary second hitch element on a trailer so that they can be readily engaged. The apparatus includes an arm which is adapted to be releasably mounted to the second hitch element. The arm has a first portion extending transversely from the second hitch element to beyond the side of the towing vehicle, and a second portion extending forwardly closely adjacent the side of the towing vehicle to indicate to the driver when the towing vehicle and trailer are transversely aligned. The guide apparatus further includes sensing means which are mounted proximate the second hitch element and are adapted to be actuated by the first hitch element as the towing vehicle and trailer are moved into positions in alignment with one another so that their hitch elements are adjacent. Indicator means, which may include an electric light or buzzer, are activated in response to the actuation of the sensing means to indicate to the driver that the hitch elements are adjacent and ready for engagement.

The primary object of the present invention is to provide a guide apparatus which serves to aid the driver of a towing vehicle in maneuvering the vehicle into proper alignment with a trailer so that their complementary hitch elements can be readily engaged without the instruction of an onlooker.

It is also an object of the present invention to provide a guide apparatus for a trailer hitch which is adapted to be removeably mounted to the hitch element of the trailer when needed, and when not in use, adapted to be collapsed and stored in either the trailer or the towing vehicle.

A futher object of the present invention is to provide a guide apparatus for a trailer hitch which can be used with vehicles of all sizes and configurations, e.g. sedans, pick-up trucks, vans, etc.

Yet another object of the present invention is to supply a guide apparatus for a trailer hitch which not only indicates to the driver that the hitch elements are adjacent, but which also indicates that the hitch element on the trailer is sufficiently elevated relative to the hitch element on the towing vehicle to permit ready engagement thereof.

The guide apparatus of the present invention is of relatively simple construction, and can be manufactured from standard commercially-available materials and retailed at a sufficiently low price to encourage its widespread use. These, as well as other objects and advantages of the present invention, will be better understood by reference to the following detailed description when considered in connection with the accompanying drawings.

BRIEF DESCRIPTION OF THE DRAWINGS

FIG. 1 is a perspective view of the guide apparatus of the present invention showing the manner in which it is mounted to the hitch element of the trailer (shown in phantom lines) and also showing the relationship of the structural components of the guide apparatus to the towing vehicle and its hitch element when the guide apparatus is in use;

FIG. 2 is a top plan view of the guide apparatus, the hitch element of the trailer, and the rear of the towing vehicle and its hitch element, taken along line 2—2 of FIG. 1;

FIG. 3 is an elevational view of the guide apparatus taken along line 3—3 of FIG. 2; and FIG. 4 is a schematic view of the electical circuitry of the guide apparatus.

DESCRIPTION OF THE PREFERRED EMBODIMENT

Referring now by reference numerals to the drawings, FIG. 1 shows the guide apparatus of the present invention generally designated 2 mounted to the hitch element 4 of a trailer, and their relationship to the rear of a towing vehicle 6 and its hitch element 8. Hitch elements 4 and 8 will be generally referred to as the trailer hitch. This is the type of trailer hitch which is most commonly used today. Hitch element 8 includes a rigid ball 10 supported in an upwardly extending position by a base 12 which is rigidly secured to the bumper 14 of towing vehicle 6. Hitch element 4 is supported on the forwardly extending tongue 16 of the trailer (shown in phantom lines) and it includes a downwardly opening semi-cylindrical socket (not shown) which is complementary to ball 10.

The socket of hitch element 4 must be vertically aligned above ball 10 of hitch element 8 in order for the hitch elements to be engaged. Once this vertical alignment is achieved, tongue 16 is lowered relative to its vertical support 18 by operating a handcrank (not shown) until hitch elements 4 and 8 are engaged.

As previously explained, although this type of trailer hitch is quite serviceable, its primary disadvantage, and that of other hitches used for the same purpose, is that the driver of the towing vehicle cannot observe the relative positions of the hitch elements when trying to maneuver the towing vehicle so that the hitch elements are adjacent and ready for easy engagement. Guide apparatus 2 provides a convenient solution to this problem. It incudes an arm having a first portion 20, a second portion 22, and a third portion 24. First portion 20 extends transversely from hitch element 4 to beyond the side 26 of the towing vehicle and includes a slotted first rod 28 which is held to a second rod 30 by a bolt set 32. Rods 28, 30 are mutually extensible so that the extension of the first portion of the arm relative to hitch element 4 can be adjusted. First portion 20 is secured to a clamp 34 which enables the guide apparatus to be releasably mounted to hitch element 4. A magnet, a shoe which fits over tongue 16, or some other form of mounting device may be substituted for clamp 34 if desired.

The second portion 22 of the arm is hingedly attached to the remote end of first portion 20 so that it can be collapsed onto the same when the guide apparatus is not in use. When the guide apparatus is in use, second portion 22 is swung out from its collapsed position so that it extends forwardly adjacent side 26 of the towing vehicle. The relative extension of first portion 20 is adjusted so that second portion 22 just barely clears side 26 of the towing vehicle when the vehicle is backed up properly, i.e., when the vehicle and the trailer are transversely aligned (see FIG. 2). First portion 20 and second portion 22 have a plurality of holes 36 so that they can be selectively attached to each other at a plurality of points along their lengths with a bolt set 37. This provides an alternative way of adjusting the configuration of the guide appratus so that portion 22 just clears the side of the towing vehicle. Thus the guide apparatus of the present invention can be adjusted for use with vehicles of varying widths.

The third portion 24 of the arm extends downwardly from the first and second portions adjacent their point of attachment and is hingedly attached to the remote end of first portion 20 so that it can be collapsed onto the same when the guide apparatus is not in use. Third portion 24 has a plurality of holes 38 so that it can be selectively attached to first portion 20 at a plurality of points along the length of third portion 24 with a bolt set 39. At its lower end third portion 24 contacts the ground or other support surface upon which the vehicle and tralier rest. Third portion 24 supports the remote end of the arm and prevents it from oscillating when the guide apparatus is in use.

A marker 40 having a pointer 42 and a magnet 44 is releasably attached to the side of the towing vehicle proximate the forwardly extending second portion 22. Pointer 42 is preferably coated with flourescent paint so that the driver can visually estimate the distance between marker 40 and portion 22 and thus the distance between hitch elements 4 and 8.

In order to make sure that hitch element 4 has been raised sufficiently to clear ball 10 of hitch element 8, prior to the mounting of guide apparatus 2 to hitch element 4, third portion 24 of the arm is held vertically against hitch element 4. Third portion 24 is then attached to first portion 20 through one of the holes 38 which is substantially higher than ball 10. The guide apparatus is then mounted to hitch element 4 with clamp 34 and hitch element 4 is raised with the crank on tongue 16 until level 46 indicates that first portion 20 is level. The level may comprise a glass cylinder which encloses a quantity of liquid. A bubble in the liquid is observed to detect variations from the horizontal. In this manner, hitch element 4 will be above ball 10 of hitch element 8 so that the hitch elements can be vertically aligned, i.e. one above the other.

The upper end of a downwardly depending T-shaped member 48 is operatively coupled to a microswitch 50 mounted to first portion 20 so that the lower end of the member is below the socket of hitch element 4. As the towing vehicle and trailer are moved into positions so that hitch elements 4 and 8 are adjacent, ball 10 of hitch element 8 will engage the lower end of member 48, thereby moving the member and closing microswitch 50. Preferably this occurs when ball 10 is directly below the socket of hitch element 4. The configuration of member 48 and the location and design of switch 50 can be adapted to different kinds of hitches.

An electric light 52 is mounted to forwardly extending second portion 22 and an electric buzzer 54 is mounted to transversly extending first portion 20. They are electrically connected to an electric power source such as a battery on the trailer (not shown) by wire 55 and a connector 56. When switch 50 is closed the electric light and buzzer are activated and this indicates to the driver that hitch elements 4 and 8 are adjacent and ready for engagement. The electrical circuitry of the guide apparatus is illustrated by way of the schematic diagram shown in FIG. 4 and it is self-explanatory.

Having described the structure of one embodiment of the guide apparatus of the present invention in detail, the manner in which it is used can be easily understood. First the guide apparatus is retrieved from its storage location. The second and third portions of the arm are swung out from their collapsed positions so that the three portions of the arm are mutually orthogonal. The third portion of the arm is held vertically against the hitch element on the rear of the vehicle in order to determine the point at which the third portion should be attached to the first portion so that the hitch element on the trailer can be raised sufficiently. The point of attachment between the third portion and the first portion is altered if necessary.

Next, the arm of the guide apparatus is mounted to the hitch element of the trailer with the clamp. The relative extension of the first portion of the arm, and the point of attachment between the second portion and the first portion, are cooperatively adjusted so that the second portion will extend forwardly adjacent the side of the towing vehicle when the towing vehicle and the trailer are transversely aligned.

The marker is attached to the side of the towing vehicle proximate the forwardly extending second portion. The driver then backs the towing vehicle toward the trailer so that the forwardly extending second portion just barely clears the side of the vehicle. The driver can observe the relative distance between the marker and the second portion of the arm in order to approximate the relative positions of the hitch elements so that the driver can slow down as they approach each other. When the light flashes and the buzzer sounds, this indicates to the driver that the hitch elements are adjacent and ready for engagement. Thereafter, the guide apparatus is removed from the hitch element on the trailer by releasing the clamp and disconnecting the connector. The second and third portions of the arm are collapsed and the guide apparatus is stored in the vehicle or in the trailer. The tongue of the trailer is lowered by means of the crank until the respective hitch elements are fully engaged.

While a preferred embodiment of the present invention has been described and illustrated in detail, it is apparent that modifications and adaptations of this embodiment will occur to those skilled in the art. For example, a photoelectric sensing device can be substituted for the member and switch. Standard household batteries suitably mounted on the arm of the guide apparatus can be used as an electric power source. The relative dimensions and configurations of the various portions of the arm can be altered to accommodate vehicles of different sizes and configurations. However, it is to be expressly understood that such modifications and adaptations are within the spirit and scope of the present invention as set forth in the following claims.

I claim:

1. Apparatus for guiding the driver of a towing vehicle in positioning a first hitch element on the towing vehicle adjacent a complementary second hitch element on a trailer so that they can be readily engaged, the apparatus comprising:
   arm means adapted to be mounted to the trailer and having a first portion extending transversely from the second hitch element to beyond the side of the towing vehicle and a second portion attached to the first portion and extending forwardly closely adjacent the side of the towing vehicle to indicate to the driver when the towing vehicle and the trailer are transversely aligned;
   sensing means mounted proximate the second hitch element and adapted to be actuated by the first hitch element as the towing vehicle and trailer are moved into positions in alignment with one another as established by the arm means so that their hitch elements are adjacent; and
   means responsive to the actuation of the sensing means for indicating to the driver that the hitch elements are adjacent and ready for engagement.

2. Apparatus according to claim 1 wherein the transversely extending first portion of the arm means comprise a plurality of mutually extensible rods.

3. Apparatus according to claim 1 wherein the arm means includes means for selectively attaching the forwardly extending second portion to the transversely extending first portion at a plurality of points along their lengths.

4. Apparatus according to claim 1 wherein the forwardly extending second portion and the transversely extending first portion are hingedly attached so that they can collapse onto each other.

5. Apparatus according to claim 1 wherein the arm means further has a third portion extending downwardly from the first and second portions adjacent their point of attachment.

6. Apparatus according to claim 5 wherein the arm means includes means for attaching the downwardly extending third portion to the transversely extending first portion at one of a plurality of points along the length of the third portion.

7. Apparatus according to claim 6 and further comprising means for indicating that the transversely extending first portion is level.

8. Apparatus according to claim 5 wherein the downwardly extending third portion and the transversely extending first portion are hingedly attached so that they can collapse onto each other for storage.

9. Apparatus according to claim 1 and further comprising means for releasably mounting the arm means to the second hitch element.

10. Apparatus according to claim 1 wherein the sensing means includes a downwardly depending member adapted to be engaged at its lower end and moved by the first hitch element.

11. Apparatus according to claim 10 wherein the sensing means further includes an electrical switch operatively coupled to the upper end of the member, the switch adapted to be closed upon movement of the member.

12. Apparatus according to claim 11 wherein the indicating means includes an electric power source and an electric light mounted to the forwardly extending second portion of the arm means and electrically connected to the power source through the switch.

13. Apparatus according to claim 11 wherein the indicating means includes an electric power source and an electric buzzer electrically connected to the power source through the switch.

14. Apparatus according to claim 1 and further comprising a marker adapted to be releasably attached to the side of the towing vehicle proximate the forwardly extending second portion of the arm means so that the driver can visually estimate the distance between the hitch elements.

15. Apparatus for guiding the driver of a towing vehicle in positioning a first hitch element on the towing vehicle adjacent a complementary second hitch element on a trailer so that they can be readily engaged, the apparatus comprising:
   arm means having a transversely extending first portion, a forwardly extending second portion, and a downwardly extending third portion, the arm means adapted to be mounted to the second hitch element so that the first portion will extend from the second hitch element to beyond the side of the towing vehicle, the second portion will extend adjacent the side of the towing vehicle, and the third portion will extend to the support surface upon which the vehicle and trailer rest;
   means for releasably mounting the arm means to the second hitch element;
   means for hingedly attaching the second and third portions of the arm means to the first portion of the arm means at one of a plurality of points along their lengths;
   sensing means mounted proximate the second hitch element including a downwardly depending member and an electrical switch, the upper end of the member operatively coupled to the switch and the lower end of the member adapted to be engaged and moved by the first hitch element to close the switch as the towing vehicle and the trailer are moved into positions so that their hitch elements are adjacent; and means responsive to the closing of the switch for indicating to the driver that the hitch elements are adjacent and ready for engagement including an electric power source and an electric light, the light mounted to the forwardly extending second portion of the arm means and electrically connected to the power source through the switch.

16. Apparatus according to claim 15 wherein the indicating means further includes an electric buzzer electrically connected to the power source through the switch.

17. Apparatus according to claim 15 and further comprising a marker adapted to be releasedly attached to the side of the towing vehicle proximate the forwardly extending second portion of the arm means so that the driver can visually estimate the distance between the hitch elements.

18. Apparatus according to claim 15 and further comprising means for indicating that the transversely extending first portion is level.

* * * * *